United States Patent [19]

Satake et al.

[11] Patent Number: 4,895,892

[45] Date of Patent: Jan. 23, 1990

[54] MELT-STABLE POLY(ARYLENE THIOETHER-KETONE) COMPOSITIONS

[75] Inventors: Yoshikatsu Satake; Takashi Kaneko; Yutaka Kobayashi; Yo Iizuka; Toshitaka Kouyama; Takayuki Katto; Zenya Shiiki, all of Iwaki, Japan

[73] Assignee: Kureha Kagaku Kogyo K.K., Tokyo, Japan

[21] Appl. No.: 194,013

[22] Filed: May 12, 1988

[30] Foreign Application Priority Data

| | | |
|---|---|---|
| May 15, 1987 [JP] | Japan | 62-118619 |
| Jun. 22, 1987 [JP] | Japan | 62-154801 |
| May 7, 1988 [JP] | Japan | 63-109917 |

[51] Int. Cl.$^4$ .............................. C08L 31/00
[52] U.S. Cl. ..................... 524/520; 524/538; 524/539; 524/540; 524/592; 525/153; 525/420; 525/471; 528/222; 528/226
[58] Field of Search ............ 525/153, 420, 471; 528/222, 226; 524/540, 520, 592, 508, 502, 538, 539, 537

[56] References Cited

U.S. PATENT DOCUMENTS

| | | | |
|---|---|---|---|
| 4,590,104 | 5/1986 | Ziener et al. | 427/389.9 |
| 4,690,972 | 9/1987 | Johnson et al. | 525/471 |
| 4,698,415 | 10/1987 | Sinclair et al. | 528/226 |
| 4,716,212 | 12/1987 | Gaughan | 528/226 |
| 4,745,167 | 5/1988 | Iizuka et al. | 526/262 |

FOREIGN PATENT DOCUMENTS

| | | |
|---|---|---|
| 270955 | 6/1988 | European Pat. Off. |
| 274754 | 7/1988 | European Pat. Off. |
| 280325 | 8/1988 | European Pat. Off. |
| 3405523 | 8/1985 | Fed. Rep. of Germany |
| 13347 | 7/1972 | Japan |
| 58435 | 4/1985 | Japan |
| 104126 | 6/1985 | Japan |
| 221229 | of 1986 | Japan |

OTHER PUBLICATIONS

Indian J. Chem., vol. 21A, May 1982, pp. 501–502.
*Indian Journal of Pure and Applied Physics*, vol. 22, Apr. 1984, pp. 247–248.
*Mol. Cryst. Liq. Cryst.*, vol. 83, 1982, pp. 229–238.

*Primary Examiner*—Morton Foelak
*Attorney, Agent, or Firm*—Lowe, Price, LeBlanc, Becker & Shur

[57] ABSTRACT

Disclosed herein is a melt-stable poly(arylene thioether-ketone) composition, which comprises:

(A) 100 parts by weight of a melt-stable poly(arylene thioether-ketone) having predominant recurring units of the formula

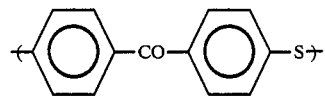

and having a melting point, Tm of 310°–380° C., a residual melt crystallization enthalpy, ΔHmc (420° C./10 min) of at least 10 J/g, a melt crystallization temperature, Tmc (420° C./10 min) of at least 210° C. and a reduced viscosity of 0.2–2 dl/g;

(B) 0–400 parts by weight of at least one of thermoplastic resins; and (C) at least one of fibrous fillers and/or at least one of inorganic fillers in a proportion of 0–400 parts by weight per 100 parts by weight of the sum of said components (A) and (B).

At least either one of the components (B) or (C) is contained in a proportion of at least 0.1 part by weight per 100 parts by weight of the component (A).

10 Claims, No Drawings

MELT-STABLE POLY(ARYLENE THIOETHER-KETONE) COMPOSITIONS

FIELD OF THE INVENTION

This invention relates to compositions of a melt-stable poly(arylene thioether-ketone) (hereinafter abbreviated as "PTK") having predominant recurring units of the formula

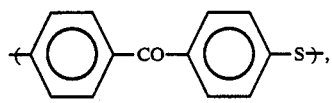

in which the —CO— and —S— are in the para position to each other, and more specifically to melt-stable poly(arylene thioether-ketone) compositions which comprise the melt-stable poly(arylene thioether-ketone), at least one of thermoplastic resins and/or at least one of various fillers, have melt stability sufficient to permit application of conventional melt processing techniques and afford heat-resistant molded or formed products.

BACKGROUND OF THE INVENTION

With the advance of weight-, thickness- and length-reducing technology in the field of the electronic and electric industry and with the recent advancement of weight-reducing technology in the fields of the automobile, aircraft and space industries, there has been a strong demand for crystalline thermoplastic resins having heat resistance of about 300° C. or higher and permitting easy melt processing in recent years.

As crystalline, heat-resistant, thermoplastic resins developed to date, there are, for example, poly(butylene terephthalate), polyacetal, poly(p-phenylene thioether), etc. These resins are however unable to meet the recent requirement level for heat resistance.

Polyether ether ketone (hereinafter abbreviated as "PEEK") and polyether ketone (hereinafter abbreviated as "PEK") have recently been developed as heat-resistant resins having a melting point of about 300° C. or higher. These resins are crystalline thermoplastic resins. It has therefore been known that conventional melt processing techniques such as extrusion, injection molding and melt spinning can be applied to easily form them into various molded or formed articles such as extruded products, injection-molded products, fibers and films. These resins however use expensive fluorine-substituted aromatic compounds such as 4,4'-difluorobenzophenone as their raw materials. Limitations are thus said to exist to the reduction of their costs. It is also pointed out that these resins involve a problem in expanding their consumption.

Based on an assumption that PTK could be promising candidate for heat-resistant thermoplastic resin like PEEK and PEK owing to their similarity in chemical structure, PTK has been studied to some extent to date. There are some disclosure on PTKs, for example, in Japanese Patent Laid-Open No. 58435/1985 (hereinafter abbreviated as "Publication A"), German Offenlegungsschrift 34 05 523A1 (hereinafter abbreviated as "Publication B"), Japanese Patent Laid-Open No. 104126/1985 (hereinafter abbreviated as "Publication C"), Japanese Patent Laid-Open No. 13347/1972 (hereinafter abbreviated as "Publication D"), Indian J. Chem., 21A, 501–502 (May, 1982) (hereinafter abbreviated as "Publication E"), and Japanese Patent Laid-Open No. 221229/1986 (hereinafter abbreviated as "Publication F").

Regarding the PTK described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTK by conventional melt processing techniques is believed to be attributed to the poor melt stability of the prior art PTKs, so that they perhaps tended to lose their crystallinity or to undergo crosslinking and/or carbonization, resulting in a rapid increase in melt viscosity, upon their melt processing.

It was attempted to produce some molded or formed products in Publications A and B. Since the PTKs had poor melt stability, it was only possible to obtain certain limited types of molded or formed products by a special molding or forming process such that a great deal of a fibrous reinforcing material is either impregnated or mixed with PTK as a sort of binder and the resultant mixture was then molded or formed under pressure.

Since the conventional PTKs are all insufficient in melt stability as described above, it has been unable to obtain molded or formed products even from compositions of the PTK with other thermoplastic resins and fillers, to say nothing of the PTK alone, by applying conventional melt processing techniques.

OBJECTS AND SUMMARY OF THE INVENTION

An object of this invention is to overcome the above-mentioned drawbacks of the prior art and hence to provide melt-stable PTK compositions which permit easy application of conventional melt processing techniques.

Another object of this invention is to provide compositions which comprise a melt-stable PTK, at least one of other thermoplastic resins and/or at least one of various fillers and can readily provide heat-resistant molded and formed products having practical mechanical properties by applying conventional melt processing techniques.

A further object of this invention is to modify and improve various physical properties and processability of melt-stable PTK and to cut down costs.

The present inventors started an investigation with a view toward using economical dichlorobenzophenone and/or dibromobenzophenone as a raw material for PTK without employing any expensive fluorine-substituted aromatic compounds. In addition, a polymerization process was designed in an attempt to conduct polymerization by increasing water content in the polymerization system to an extremely high level compared to processes reported previously, adding a polymerization aid and suitably controlling the profile of the polymerization temperature. As a result, high molecular-weight PTKs were obtained economically. The PTKs obtained by the above process were however still dissatisfactory in melt stability. Thus, the present inventors made further improvements in the polymerization process. It has then been revealed that melt-stable PTK, which has been improved significantly in melt stability compared to the conventional PTK and hence permits the application of conventional melt processing techniques, can be obtained by conducting polymerization in a system free of any polymerization aid while paying attention to the selection of a charge ratio of monomers, the shortening of the polymerization time at high temperatures, the selection of a material for a polymerization reactor and if necessary, by applying a stabilization treatment in a final stage of the polymerization. It has also been found that molded and formed products such as extrusion products, injection-molded products, fibers and films could be obtained easily from compositions of such melt-stable PTK with thermoplastic resins and inorganic fillers by conventional melt processing techniques. The present invention has been brought to completion on the basis of these findings.

In one aspect of this invention, there is thus provided a melt-stable poly(arylene thioether-ketone) composition comprising:

(A) 100 parts by weight of a melt-stable poly(arylene thioether-ketone) having predominant recurring units of the formula

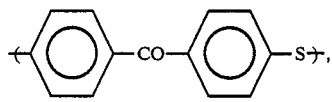

wherein the —CO— and —S— are in the para position to each other, and having the following physical properties (a)-(c):

(a) melting point, Tm being 310°–380° C.;

(b) residual melt crystallization enthalpy, $\Delta$Hmc (420° C./10 min) being at least 10 J/g, and melt crystallization temperature, Tmc (420° C./10 min) being at least 210° C., wherein $\Delta$Hmc (420° C./10 min) and Tmc (420° C./10 min) are determined by a differential scanning calorimeter (hereinafter referred to as "DSC") at a cooling rate of 10° C./min, after the poly(arylene thioether-ketone) is held at 50° C. for 5 minutes in an inert gas atmosphere, heated to 420° C. at a rate of 75° C./min, and then held for 10 minutes at 420° C.; and (c) reduced viscosity being 0.2–2 dl/g as determined by viscosity measurement at 25° C. and a polymer concentration of 0.5 g/dl in 98 percent by weight sulfuric acid;

(B) 0–400 parts by weight of at least one of thermoplastic resins; and (C) at least one of fibrous fillers and/or at least one of inorganic fillers in a proportion of 0–400 parts by weight per 100 parts by weight of the sum of said components (A) and (B);

at least either one of said components (B) or (C) being contained in a proportion of at least 0.1 part by weight per 100 parts by weight of said component (A).

According to the present invention, a PTK composition permitting molding or forming by applying conventional melt processing techniques can be obtained for the first time owing to the use of a PTK having melt stability. In addition, molded or formed products such as extruded products, injection-molded products, fibers and films can be easily obtained from a composition of the melt-stable PTK with at least one of thermoplastic resins and at least one of fibrous fillers and/or at least one of inorganic fillers by applying conventional melt processing techniques.

DETAILED DESCRIPTION OF THE INVENTION

Features of the present invention will hereinafter be described in detail.

Chemical Structure of PTK

The melt-stable PTK according to the present invention is poly(arylene thioether-ketone) (PTK) having predominant recurring units of the formula

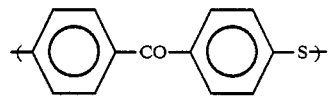

wherein the —CO— and —S— groups are in the para position to each other. In order to be heat-resistant polymers comparable with PEEK and PEK, the PTK of this invention may preferably contain, as a main constituent, the above recurring units in a proportion greater than 50 wt. %, more preferably, of 60 wt. % or higher, most preferably, of 70 wt. % or higher. If the proportion of the recurring units is 50 wt. % or less, there is a potential problem that the crystallinity of the polymer is reduced and its heat resistance is reduced correspondingly.

Exemplary recurring units other than the above recurring units may include:

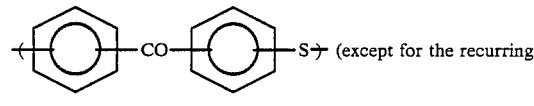 (except for the recurring unit in which —CO— and —S— are in the para position to each other.);

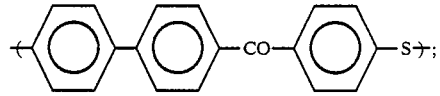

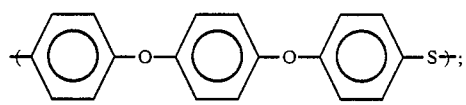

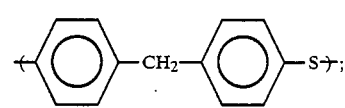

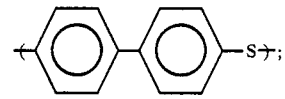

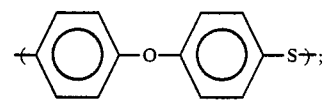

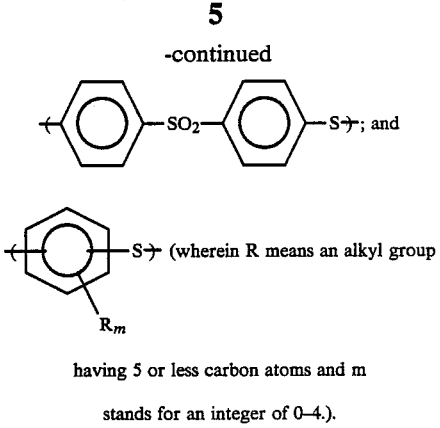

(wherein R means an alkyl group having 5 or less carbon atoms and m stands for an integer of 0–4.).

It is desirable that the melt-stable PTK of this invention is an uncured polymer, especially, an uncured linear polymer. The term "cure" as used herein means a molecular-weight increasing treatment by a method other than a usual polycondensation reaction, for example, by a crosslinking, branching or molecular-chain extending reaction, particularly, a molecular-weight increasing treatment by a high-temperature heat treatment or the like. In general, "curing" causes PTK to lose or decrease its melt stability and crystallinity. Curing therefore makes it difficult to employ conventional melt processing of PTK. Even if a molded or formed product is obtained, the product tends to have a low density and reduced crystallinity, in other words, may not be regarded as "a heat-resistant, mold or formed product" substantially. Curing is hence not preferred.

However, PTK having a partially crosslinked and/or branched structure to such an extent still allowing the application of conventional melt processing techniques are still embraced in the present invention. For example, PTK obtained by polymerization in the presence of a small amount of at least one of crosslinking agents (e.g., polychlorobenzophenone, polybromobenzophenone and the like) and PTK subjected to mild curing can be regarded as melt-stable PTK useful in compositions according to this invention.

Physical Properties of PTK

Summary of the physical properties:

The melt-stable PTK useful in the practice of this invention have the following physical properties.

(a) As an index of the characteristics of a heat-resistant polymer, its melting point, Tm ranges from 310° to 380° C.

(b) As an index of the melt stability of polymer to which conventional melt processing techniques can be applied, its residual melt crystallization enthalpy, $\Delta Hmc$ (420° C./10 min) is at least 10 J/g, and its melt crystallization temperature, Tmc (420° C./10 min) is at least 210° C.

(c) In the case of extrusion products, fibers, films and the like, their shaping is difficult due to drawdown upon melt forming unless the molecular weight is sufficiently high. It should have a high molecular weight. As an index of the molecular weight of the polymer, its reduced viscosity, $\eta_{red}$ should be within the range of 0.2–2 dl/g. In the present invention, each reduced viscosity, $\eta_{red}$ is expressed by a value as determined by viscosity measurement at 25° C. and a polymer concentration of 0.5 g/dl in 98 percent by weight sulfuric acid.

(d) As an index of the characteristics of a highly-crystalline polymer, the density of the polymer obtained in a crystallized form by annealing it at 280° C. for 30 minutes is at least 1.34 g/cm$^3$ at 25° C.

Next, the physical properties of the melt-stable PTK useful in the practice of this invention will be described in detail.

(1) Heat resistance:

The melting point, Tm of a polymer serves as an index of the heat resistance of the polymer.

The PTK of the present invention has a melting point, Tm of 310°–380° C., preferably 320°–375° C, more preferably 330°–370° C. Those having a melting point, Tm lower than 310° C. are insufficient in heat resistance as heat-resistant resins comparable with PEEK and PEK. On the other hand, it is difficult to perform melt processing of those having a melting point, Tm higher than 380° C. without decomposition. Such an excessively low or high melting point is undesired.

(2) Melt stability:

The greatest feature of the PTK of the present invention resides in that it has melt stability sufficient to permit the application of conventional melt processing techniques.

All the conventional PTKs have low melt stability and tend to lose their crystallinity or to undergo crosslinking or carbonization, resulting in a rapid increase in melt viscosity, upon their melt processing.

It is hence possible to obtain an index of the melt processability of PTK by investigating the residual crystallinity of PTK after holding it at an elevated temperature of its melt processing temperature or higher for a predetermined period of time. The residual crystallinity can be evaluated quantitatively in terms of melt crystallization enthalpy. Specifically, the residual melt crystallization enthalpy, $\Delta Hmc$ (420° C./10 min) and its melt crystallization temperature, Tmc (420° C./10 min) of the PTK which are determined by a DSC at a cooling rate of 10° C./min after the PTK is held at 50° C for 5 minutes in an inert gas atmosphere, heated to 420° C. at a rate of 75° C./min, and then held for 10 minutes at 420° C., can be used as measures of its melt stability. In the case of a PTK having poor melt stability, it undergoes crosslinking or the like at the above high temperature condition of 420° C. and loses its crystallinity substantially.

The melt-stable PTK of the present invention is a polymer whose residual melt crystallization enthalpy, $\Delta Hmc$ (420° C./10 min) is preferably at least 10 J/g, more preferably at least 15 J/g, most preferably at least 20 J/g and whose melt crystallization temperature, Tmc (420° C./10 min) is preferably at least 210° C., more preferably at least 220° C, most preferably at least 230° C.

A PTK, whose $\Delta Hmc$ (420° C./10 min) is smaller than 10 J/g or whose Tmc (420° C./10 min) is lower than 210° C, tends to lose its crystallinity or to induce a melt viscosity increase upon its melt processing, so that difficulties are encountered upon application of conventional melt processing techniques.

(3) Molecular weight:

The solution viscosity, for example, reduced viscosity, $\eta_{red}$ of a polymer can be used as an index of its molecular weight.

When a PTK composition is subjected to extrusion or melt spinning by way of example, drawdown or the like may occur as a problem upon its melt processing.

Therefore, the molecular weight which is correlated directly to the melt viscosity of PTK is also an important factor for its melt processability.

In order to apply conventional melt processing techniques, high molecular-weight PTK whose reduced viscosity, $\eta_{red}$ is preferably 0.2–2 dl/g, more preferably 0.3–2 dl/g, most preferably 0.5–2 dl/g is desired. Since a PTK whose $\eta_{red}$ is lower than 0.2 dl/g has a low melt viscosity and high tendency of drawdown, it is difficult to apply conventional melt processing techniques. Further, molded or formed products obtained from such a PTK are insufficient in mechanical properties. On the other hand, a PTK whose $\eta_{red}$ exceeds 2 dl/g is very difficult to be produced or processed.

(4) Crystallinity:

As an index of the crystallinity of a polymer, its density is used.

The PTK of the present invention is desirably a polymer whose density (at 25° C) is preferably at least 1.34 g/cm$^3$, more preferably at least 1.35 g/cm$^3$ when measured in a crystallized form by annealing it at 280° C. for 30 minutes. Those having a density lower than 1.34 g/cm$^3$ have potential problems that they may have low crystallinity and hence insufficient heat resistance and their processability such as injection-moldability and mechanical properties of resulting molded or formed products may also be insufficient.

In particular, PTK crosslinked to a high degree (e.g., the PTK described in Publication A) has been reduced in crystallinity and its density is generally far lower than 1.34 g/cm$^3$.

Production Process of PTK

The melt-stable PTK of the present invention can be produced, for example, by subjecting an alkali metal sulfide and a dihalogenated aromatic compound, preferably, dichlorobenzophenone and/or dibromobenzophenone to a dehalogenation or sulfuration reaction, for a short period of time, in the substantial absence of a polymerization aid (a salt of a carboxylic acid, or the like), in an aprotic polar organic solvent, preferably, an organic amide solvent (including a carbamic amide or the like) and in a system having a water content far higher compared with polymerization processes of the prior art while controlling the temperature profile suitably, and if necessary, by choosing the material of a reactor suitably.

Namely, the melt-stable PTK of the present invention can be produced suitably by polymerizing an alkali metal sulfide and a dihalogenated aromatic compound consisting principally of dichlorobenzophenone and/or dibromobenzophenone by a dehalogenation or sulfuration reaction under the following conditions (a)–(c) in an organic amide solvent.

(a) ratio of the water content to the amount of the charged organic amide solvent being 2.5–15 (mole/kg);

(b) ratio of the amount of the charged dihalogenated aromatic compound to the amount of the charged alkali metal sulfide being 0.95–1.2 (mole/mole); and (c) reaction temperature being 60°–300° C. with a proviso that the reaction time at 210° C. and higher is within 10 hours.

The melt-stable PTK can be obtained more suitably when a reactor at least a portion of which, said portion being brought into contact with the reaction mixture, is made of a corrosion-resistant material such as titanium material.

If desired, at least one halogen-substituted aromatic compound having at least one substituent group having electron-withdrawing property at least equal to —CO— group (preferably, 4,4'-dichlorobenzophenone and/or 4,4'-dibromobenzophenone employed as a monomer) may be added and reacted (as stabilization treatment in a final stage of the polymerization) so as to obtain PTK improved still further in melt stability.

The melt-stable PTK employed in the present invention may preferably be an uncured polymer as described above. It may however be PTK in which a crosslinked structure and/or a branched structure has been incorporated to a certain minor extent. In order to obtain a PTK with a branched or crosslinked structure introduced therein, it is preferable to have a polyhalogenated compound, especially, a polyhalogenated benzophenone having at least three halogen atoms exist as a crosslinking agent in the polymerization reaction system in such an amount that the charge ratio of the monomeric dihalogenated aromatic compound to the polyhalogenated benzophenone ranges from 100/0 to 95/5 (mole/mole). If the charged amount of the polyhalogenated benzophenone is too much, physical properties of the resulting PTK, such as its melt processability, density and crystallinity, will be reduced. It is hence not preferable to charge such a polyhalogenated benzophenone too much.

Composition

With a view toward modifying and/or improving various properties (for example, mechanical properties, electrical properties, thermal properties, chemical properties, etc.) of the above-described melt-stable PTK, modifying and improving their processability and also reducing their costs, the compositions of the present invention have been obtained by mixing PTK (Component A) with at least one of thermoplastic resins (Component B), at least one of fibrous fillers and/or at least one of inorganic fillers (Component C) and optionally, one or more other components or additives.

Components other than the PTK in the compositions of this invention will hereinafter be described.

Thermoplastic Resin (Component B):

The compositions of this invention contains, as Component B, at least one of thermoplastic resins in a proportion of 0–400 parts by weight, preferably 0–200 parts by weight, more preferably 0–90 parts by weight per 100 parts by weight of Component A. If the proportion of Component B exceeds 400 parts by weight, there is a possible problem that the advantageous properties of the PTK, heat-resistant and crystalline thermoplastic resins, could be impaired.

If the proportion of the filler (Component C) is 0 part by weight, in other words, the filler is not added, it is necessary to add Component B in a proportion of at least 0.1 part by weight per 100 parts by weight of Component A. If the proportion of Component B added is smaller than 0.1 part by weight in this case, Component B can exhibit little effects in modifying and/or improving Component A.

As exemplary polymers of the thermoplastic resin useful as Component B in the present invention, may be mentioned resins such as poly(arylene thioethers), aromatic polyether ketones, e.g., PEEKs and PEKs, polyamides (including Aramids), polyamideimides, polyesters (including aromatic polyesters and liquid crystalline polyesters), aromatic polysulfones, e.g., polysulfones and polyether sulfones, polyether imides, polyarylenes, poly(phenylene ethers), polycarbonates, polyester carbonates, polyacetals, fluoropolymers, e.g., polytetrafluoroethylene, polyolefins, polystyrenes, polymethyl methacrylate, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers.

These thermoplastic resins may be used either singly or in combination.

Among the above-exemplified thermoplastic resins, poly(arylene thioethers), especially, poly(arylene thioethers) having predominant recurring units of the formula

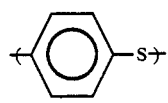

(hereinafter abbreviated as "PATE"; said recurring units accounting for at least 50 wt. %) are preferred, because they have excellent compatibility with the PTK (for example, in view of the glass transition points of the resultant mixtures, their crystallization temperatures $T_{c1}$ from a glassy state, their crystallization temperatures $T_{c2}$ from molten state and the behavior of the peaks of melting points of their crystals, all, measured by DSC), their blending with the PTK can improve the mechanical properties of the PTK compositions over those of the PTK alone and the heat resistance and flashing characteristics of the PTK compositions over those of PATE alone, and compositions well-balanced in heat resistance, mechanical properties and flow characteristics can be obtained. In addition, another important feature has also been found unexpectedly that compositions without fibrous filler and/or inorganic filler are transparent products in a amorphous form.

The mechanical properties of the resultant compositions are improved by blend of a liquid crystalline polyester (hereinafter abbreviated as "LCP"), especially, a wholly-aromatic LCP, with Component A (PTK), over those of the PTK alone, and the tendency of exfoliation and the anisotropy which are drawbacks of the LCP alone can also be improved. The blend of the LCP can therefore provide starting compositions for molded and formed products excellent in mechanical properties, flow characteristics and surface characteristics, and is hence preferred.

The blend of a polyether imide with Component A (PTK) is also preferred, since the drawdown properties, mechanical properties and dimensional stability are improved over those of the PTK alone, the heat resistance and flow characteristics are improved over those of the polyether imide alone, and the blend provides compositions well-balanced in heat resistance, dimensional stability, mechanical properties and flow characteristics.

The blend of polytetrafluoroethylene with Component A (PTK) is also preferred, because the resultant compositions are useful as materials for molded and formed product having excellent self-lubricating properties.

By blending an aromatic polyether ketone with Component A (PTKs), the drawdown, mechanical properties (toughness in particular), melt stability at the time of melt processing, etc. are improved compared with their corresponding properties of the PTK alone. Although aromatic polyether ketone involve such problems as high prices and difficult molding or forming and processing, it is feasible to improve its flow characteristics and heat resistance by blend it with the PTK. As a further advantage, the blend of such an aromatic polyether ketone provides compositions which are excellent in economy too. As illustrative examples of the aromatic polyether ketone, PEK and PEEK may be mentioned.

The drawdown, the retention of mechanical properties at elevated temperatures and the dimensional stability at high temperatures can be improved by blend of an aromatic polysulfone with Component A (PTK), compared with the corresponding properties of the PTK alone. On the other hand, the blend of a PTK with aromatic polysulfones is also preferred since compositions having flowability improved over the deficient flowability of the aromatic polysulfones can be obtained. As aromatic polysulfones, polysulfones and polyether sulfones are preferred.

Filler (Component C):

The compositions of the present invention feature to contain, as Component C, at least one of fibrous fillers and/or at least one of inorganic fillers in a proportion of 0–400 parts by weight, preferably 0–300 parts by weight, more preferably 0–200 parts by weight, per 100 parts by weight of the resin components (Component A + Component B). If the proportion of Component C exceeds 400 parts by weight, there is a potential problem that the processability may be deteriorated to a considerably extent. Such a large proportion is therefore not preferred.

Where the proportion of Component B (thermoplastic resin) mixed is 0 part by weight, in other words, Component B is not added, Component C must be added in a proportion of at least 0.1 part by weight per 100 parts by weight of Component A (PTK). If the proportion of Component C is smaller than 0.1 part by weight in this case, such a proportion is too small to bring about sufficient effects for the modification and/or improvement of Component A.

As exemplary fibrous fillers usable as Component C, may be mentioned fibers such as glass fibers, carbon fibers, graphite fibers, silica fibers, alumina fibers, zirconia fibers, silicon carbide fibers and Aramid fibers; as well as whiskers such as potassium titanate whiskers, calcium silicate (including wollastonite) whiskers, calcium sulfate whiskers, carbon whiskers, silicon nitride whiskers and boron whiskers. Among these fibrous fillers, glass fibers, carbon fibers and Aramid fibers are preferred from the viewpoints of physical properties and economy. Of these, short fibers having a fiber length of 10 cm or shorter are particularly preferred.

As exemplary inorganic fillers, may be mentioned talc, mica, kaolin, clay, silica, alumina, silica-alumina, titanium oxide, iron oxides, chromium oxide, calcium carbonate, calcium silicate, calcium phosphate, calcium sulfate, magnesium carbonate, magnesium phosphate, silicon, carbon (including carbon black), graphite, silicon nitride, molybdenum disulfide, glass, hydrotalcite, ferrite, samarium-cobalt, neodium-iron-boron, etc., all, in a powder form.

These fibrous fillers and inorganic fillers may be used either singly or in combination.

Optional Components:

The PTK compositions of the present invention may also be added with additives such as stabilizers, corrosion preventives, surface-roughening agents, nucleating agents, mold releasing agents, colorants, coupling agents, flashing preventives and/or antistatic agents, as needed.

Application Fields

The PTK compositions of this invention can be used directly as heat-resistant and corrosion-resistant coating agents, sizing agents for various fillers, hot-melt melt adhesives, sealants, etc.

The PTK compositions of this invention can also be molded or otherwise formed by conventional melt processing techniques for use in various fields. For example, injection-molded products may be used as various electronic and electric parts (circuit boards, sealants for electronic parts, connectors, etc.), car parts (various parts installed around engines), precision parts (parts for cameras, watches, clocks, etc.), plastic magnets, sliding members, etc. Extrusion and pultrusion products may be used as sheets and plates (stampable sheets, trays, etc.), pipes and tubes (pipings for the chemical industry, warm/hot water pipings, pipes for electric wires and cables, etc.), heat-resistant covered conductors, blow bottles, rods, profiles, etc.

Those formed into a fibrous shape may be used, for example, as industrial filters, heat-insulating materials, reinforcing fibers, insulating tapes, insulating cloths, fireproof wears, high-temperature gloves, prepreg fibers, tension members for optical fiber cables, etc.

Those formed into a film-like shape may be used, for example, as base films for magnetic recording materials (especially, including films for vacuum deposition or sputtering and films for magnetic recording films of the perpendicular magnetization type), films for capacitors (films for chip-type capacitors, in particular), printed circuit boards (including both flexible and rigid types), insulating films, printer tapes, stampable sheets, various trays, containers, etc.

Compression-molded products may be used as sealing materials for sliding members, friction materials, etc.

ADVANTAGES OF THE INVENTION

The compositions of the present invention are obtained by adding, to high crystalline process PTK having a high degree of melt stability sufficient for the application of conventional melt processing techniques and a sufficient molecular weight and produced at an economical cost, one or more components intended to modify and/or improve the PTK. Using these PTK compositions as raw materials, various heat-resistant molded and formed products having practical mechanical properties, such as extrusion products, injection-molded products, fibers and films as well as heat resistant coating materials, sizing materials, adhesives, sealants and the like having practical mechanical properties can be obtained at economical costs.

EMBODIMENTS OF THE INVENTION

The present invention will hereinafter be described specifically by the following Examples and Comparative Examples. It should however be borne in mind that the present invention is not limited to the following Examples only.

EXPERIMENTS

Synthesis Experiment 1: (Synthesis of Melt-Stable PTK)

A titanium-lined reactor was charged with 90 moles of 4,4'-dichlorobenzophenone (hereinafter abbreviated as "DCBP"; product of Ihara Chemical Industry Co., Ltd.), 90 moles of hydrated sodium sulfide (water content: 53.8 wt. %; product of Sankyo Kasei Co., Ltd.) and 90 kg of N-methylpyrrolidone (hereinafter abbreviated as "NMP") (water content/NMP=5.0 moles/kg). After the reactor being purged with nitrogen gas, the resultant mixture was heated from room temperature to 240° C. over 1.5 hours and then maintained at 240° C. for 1.5 hours. In order to apply the stabilization treatment in the final stage of the polymerization, the reaction mixture was heated to 260° C. over 0.5 hour while charging under pressure a mixture composed of 4.5 moles of DCBP, 18 kg of NMP and 90 moles of water. The resultant mixture was maintained further at 260° C. for 1.0 hour to react them.

The reactor was cooled, and the reaction mixture in the form of a slurry was taken out of the reactor and was then poured into about 200 l of acetone. The resultant polymer was precipitated. The polymer was recovered by filtration, and then washed twice with acetone and additionally twice with water. Acetone and water were removed to obtain the polymer in a wet form. The wet polymer was dried at 80° C. for 12 hours under reduced pressure, thereby obtaining Polymer K1 as an ivory powder.

Synthesis Experiment 2: (Synthesis of Melt-Stable PTK)

Polymerization was conducted in the same manner (water content/NMP=5.0 mole/kg) as in Synthesis Experiment 1 except that 90 moles of DCBP and 0.4 mole of p-dibromobiphenyl were used instead of 90 mole of DCBP and the reaction time at 240° C. was changed from 1.5 hours to 1.0 hour. The reaction mixture in the form of a slurry was then processed in the same manner as in Synthesis Experiment 1, whereby Polymer K2 was obtained as an ivory powder.

Synthesis Experiment 3: (Synthesis of Conventional PTK)

A reactor made of SUS 316 (Stainless Steel Type as prescribed in the ASTM) was charged with 10 moles of sodium sulfide nonahydrate, 5.0 l of NMP and 10 moles of lithium acetate. The resultant mixture was heated up to 200° C. under a nitrogen gas stream to remove water therefrom, whereby 1580 g of distilled aqueous solution containing 104 g of NMP was obtained. After cooling the reaction system to 120° C., a solution formed of 10 moles of DCBP and 0.8 l of NMP was charged (water content/NMP=1.4 moles/kg). The thus-obtained mixture was maintained, under stirring and nitrogen gas pressure, at 230° C. for 2 hours and then at 250° C. for 1 hour so as to polymerize them. After the polymerization reaction, the reaction mixture in the form of a slurry was poured into water. A polymer thus precipitated was washed with water and acetone separately and repeatedly, and was then dried to obtain Polymer K3 as a brown powder.

A portion of Polymer K3 was heated at 250° C. for two hours in air, thereby obtaining Polymer K3C in the form of cured black powder.

Synthesis Experiment 4: (Synthesis of Conventional PTK)

A reactor made of SUS 316 was charged with 1.0 mole of sodium sulfide trihydrate, 800 ml of NMP and 1.0 g of sodium hydroxide. The resulting mixture was heated up to 210° C., whereby 42 g of distilled water containing 3 g of NMP was obtained. The residue was then cooled to about 45° C. Under vigorous stirring, 1.0 mole of 4,4'-difluorobenzophenone and 0.033 mole of sodium sulfite were added (water content/NMP=0.9 mole/kg). The reaction system was pressurized to 5 atm with nitrogen gas, and the contents were maintained at 250° C. for 4 hours to polymerize them. After the reaction, the reactor was cooled to 100° C., and the reaction mixture in the form of a slurry was taken out. The resulting polymer was separated and then washed with hot water and acetone separately and repeatedly. After sufficient washing the polymer, it was dried fully to obtain Polymer K4 as a yellowish brown powder.

Synthesis Experiment 5: (Synthesis of Conventional PTK)

In exactly the same manner as in Synthesis Experiment 4 except that DCBP was used instead of 4,4'-difluorobenzophenone, Polymer K5 was obtained as a yellowish brown powder.

Synthesis Experiment 6: (Synthesis of Conventional PTK)

In a flask, 0.804 mole of 4-(4-chlorobenzoyl)-thiophenol, 45.1 g (114.5 g/mole solution) of an aqueous solution of potassium hydroxide, 300 g of 1,1-dioxothiolan and 300 g of diphenylsulfone were heated for 3 hours under reduced pressure (15 Torr). The reaction mixture was heated from 20° C. to 260° C. to remove the resultant water and 1,1-dioxothiolan, whereby the reaction mixture turned to a solid (the water content was practically 0). The mixture was cooled and then heated at 350° C. for 3 hours in a nitrogen gas atmosphere. The mixture turned to a liquid at about 340° C. The mixture was cooled and solidified. It was taken out of the flask, ground and extracted four times with 4 l of hot methanol, twice with 4 l of hot water and once again with 4 l of hot methanol, and then dried to obtain Polymer K6 as a yellow powder.

Synthesis Experiment 7: (Synthesis of Conventional PTK)

Ten moles of DCBP were dissolved in 30 kg of DMF. Ten moles of sodium sulfide nonahydrate were charged in a reactor made of SUS 316, followed by an addition of the above-prepared solution (water content/DMF=3 moles/kg). After the reactor being purged with nitrogen gas, they were reacted at about 175° C. for 27 hours. The thus-obtained reaction mixture was washed 5 times with hot water and 5 times with DMF, thereby obtaining Polymer K7 as a yellow powder. Incidentally, Polymers K3, K3C (cured form), K4, K5, K6 and K7 were prepared by following the processes disclosed in Publications A, A, B, B, D and E respectively. They were provided as exemplary PTKs according to the prior art.

Measurement of melting points:

With respect to each of the PTK thus obtained, the melting point, Tm was measured as an index of its heat resistance. The measurement was performed in the following manner. About 10 mg of each PTK (powder) was weighed. The sample was held at 50° C. for 5 minutes in an inert gas atmosphere, then heated up at a rate of 10° C./min so as to measure its melting point on a DSC (Model TC 10A; manufactured by Metler Company). Results are collectively shown in Table 1.

Measurement of residual melt crystallization enthalpies:

With respect to each of the PTKs polymerized above, the residual melt crystallization enthalpy, $\Delta Hmc$ (420° C./10 min) was measured as an index of its melt stability. Namely, the temperature corresponding to a peak of melt crystallization measured by the DSC is represented by Tmc (420° C./10 min) and the amount of heat converted from the area of the peak was taken as residual melt crystallization enthalpy, $\Delta Hmc$ (420° C./10 min). Described specifically, about 10 mg of each PTK (powder) was weighed. After holding the PTK at 50° C. for 5 minutes in an inert gas atmosphere, it was heated at a rate of 75° C./min up to 420° C. and held at that temperature for 10 minutes. While cooling the PTK at a rate of 10° C./min, its $\Delta Hmc$ (420° C./10 min) and Tmc (420° C./10 min) were measured. Results are collectively shown in Table 1.

Melt processing test:

With respect to each of the PTKs obtained in the Synthesis Experiments, melt extrusion was conducted to investigate its melt processability, in other words, to test the long run characteristics of its melt processing. Namely, each PTK (powder) was charged under a nitrogen gas stream into a single-screw extruder which had a cylinder diameter of 40 mm and a cylinder length of 1 m and was equipped with a nozzle having a diameter of 5 mm. The PTK was molten and extruded at a cylinder temperature of 375° C. and a residence time in the cylinder of about 3 minutes. For each PTK, the time was measured from the initiation of its extrusion until its extrusion became difficult due to increase of extrusion torque. Results are also given collectively in Table 1.

Preliminary Experiment on Extrusion of Compositions:

Seventy parts-by-weight portions of the PTKs obtained in the above synthesis experiments were respectively blended well with 30 parts by weight of glass fibers (13 $\mu m$ across, 3 mm long; product of Nippon Electric Glass Co., Ltd.) in a tumbler blender. Then, the resultant blends were respectively charged under a nitrogen gas stream into a single-screw extruder equipped with a nozzle of 5 mm across and having a cylinder of 40 mm across and 1 m long, followed by melt-extrusion into strands under the conditions of a cylinder temperature of 375° C. and a residence time in the cylinder of about 3 minutes. The strands were quenched and chopped, whereby pellets of the respective compositions were obtained.

When the compositions whose PTK had $\Delta Hmc$ (420° C./10 min) smaller than 10 J/g were supplied, an abrupt increase in extrusion torque which seems to be attributable to a thermal crosslinking reaction was observed immediately after the initiation of their extrusion. It was hence found that useful pellets were unavailable from the compositions making use of Polymers K3–K7 having $\Delta Hmc$ (420° C./10 min) smaller than 10 J/g.

Thermal properties and extrudability of the respective PTK are shown collectively in Table 1.

TABLE 1

|  | Example | | Comp. Ex. |
| --- | --- | --- | --- |
|  | Synthesis Experiment 1 | Synthesis Experiment 2 | Synthesis Experiment 3 |
| Heat resistance | | | |
| Tm (°C.) | 357 | 362 | 335 |
| Melt stability | | | |
| ΔHmc (420° C./10 min) (J/g) | 54 | 58 | 0 |
| Tmc (420° C./10 min) (°C.) | 300 | 305 | ND[2] |
| Melt processing long-run time (hr) | >2 | >2 | <0.5 |
| Extrudability of composition | Good | Good | Poor |
| Polymer No. | K1 | K2 | K3 |
| Remarks |  |  | Conventional PTK |

|  | Comparative Example | | |
| --- | --- | --- | --- |
|  | Synthesis Experiment 3 | Synthesis Experiment 4 | Synthesis Experiment 5 |
| Heat resistance | | | |
| Tm (°C.) | 331 | 365 | 363 |
| Melt stability | | | |
| ΔHmc (420° C./10 min) (J/g) | 0 | 0 | 0 |
| Tmc (420° C./10 min) (°C.) | ND[2] | ND[2] | ND[2] |
| Melt processing long-run time (hr) | <0.5 | <0.5 | <0.5 |
| Extrudability of composition | Poor | Poor | Poor |
| Polymer No. | K3C | K4 | K5 |
| Remarks | Conventional PTK (cured) | Conventional PTK | Conventional PTK |

|  | Comparative Example | |
| --- | --- | --- |
|  | Synthesis Experiment 6 | Synthesis Experiment 7 |
| Heat resistance | | |
| Tm (°C.) | 355 | 330–360[1] |
| Melt stability | | |
| ΔHmc (420° C./10 min) (J/g) | 0 | 0 |
| Tmc (420° C./10 min) (°C.) | ND[2] | ND[2] |
| Melt processing long-run time (hr) | <0.5 | <0.5 |
| Extrudability of composition | Poor | Poor |
| Polymer No. | K6 | K7 |
| Remarks | Conventional PTK | Conventional PTK |

[1]Instable plural melting-point peaks were observed, probably, due to decomposition.
[2]ND: Not detected.

Measurements of densities and solution viscosities:

With respect to Polymers K1 and K2 having good melt processability and Polymer K3C as a conventional cured PTK, their densities were measured as indices of their crystallinity. Namely, each PTK (powder) was first of all placed between two sheets of polyimide film ("Kapton", trade mark; product of E.I. du Pont de Nemours & Co., Inc.). It was preheated at 385° C. for 2 minutes and then press-formed at 385° C. for 0.5 minute by a hot press. It was then quenched to obtain an amorphous sheet whose thickness was about 0.15 mm. A part of the amorphous sheet was used directly as a sample, while the remaining part was annealed at 280° C. for 30 minutes to use it as an annealed sample with an increased degree of crystallization. Their densities were measured at 25° C. by means of a density gradient tube (lithium bromide/water).

Results are given collectively in Table 2. It was found from Table 2 that the density of Polymer K3C, a conventional cured PTK, did not increase to any substantial extent even when annealed and its crystallinity was hence extremely low.

As to PTK Polymers K1 and K2 having good melt processability, their solution viscosities (reduced viscosities, $\eta_{red}$) were measured respectively as an index of their molecular weight.

Namely, each PTK sample was dissolved in 98 wt. % sulfuric acid to give a polymer concentration of 0.5 g/dl. The reduced viscosity of the resultant solution was then measured at 25° C by means of a Ubbellohde viscometer. It was however impossible to measure the reduced viscosity of Polymer K3C which was a cured PTK, since it was substantially insoluble in 98 wt. % sulfuric acid. Results are also shown collectively in Table 2.

TABLE 2

|  | Example | | Comp. Ex. |
| --- | --- | --- | --- |
|  | Synthesis Experiment 1 | Synthesis Experiment 2 | Synthesis Experiment 3 |
| Density (25° C.) | | | |
| Amorphous sheet (g/cm³) | 1.30 | 1.30 | 1.27[1] |
| Annealed sheet (g/cm³) | 1.35 | 1.35 | 1.30[1] |
| Evaluation of crystallinity | High | High | Extremely low |
| Molecular weight, $\eta_{red}$ (dl/g) | 0.80 | 0.52 | —[2] |
| Remarks: Polymer No. | K1 | K2 | K3C |

TABLE 2-continued

| | Example | | Comp. Ex. |
|---|---|---|---|
| | Synthesis Experiment 1 | Synthesis Experiment 2 | Synthesis Experiment 3 |
| | | | Conventional cured PTK |

[1]Thermal decomposition was observed in the course of the preparation of the amorphous sheet.
[2]Substantially insoluble in 98 wt. % sulfuric acid.

EXAMPLE 1

Predetermined amounts of Polymers K1 and K2, which had been found to give useful pellets by the preliminary experiment for the extrusion of the compositions, were respectively blended with prescribed amounts of various fibrous fillers in the same manner as in the preliminary experiment on extrusion of composition. The resultant compositions were respectively molten and extruded into strands, quenched and chopped, so that pellets of the each composition which contained the various fibrous fillers were prepared respectively. The pellets of each composition were charged into an injection molding machine under a nitrogen gas stream and were then molded under the conditions of a cylinder temperature of 375° C., a mold temperature of 180° C., an injection-holding pressure of 1,000 Kg/cm², an injection molding cycle of about 40 seconds and a residence time in the cylinder of about 1 minute, thereby obtaining injection-molded products. The molded products were annealed at 280° C. for 4 hours.

Proportions of the fibrous fillers and physical properties of the annealed molded products are given in Table 3. It has been found that strength, flexural modulus, heat resistance (heat distortion temperature) and the like are improved significantly by the incorporation of a fibrous filler.

EXAMPLE 2

In the same manner as in the preliminary experiment on the extrusion of the compositions, prescribed amounts of various inorganic fillers were separately blended with a predetermined amount of Polymer K1 as a PTK, followed by preparation of pellets. Using those pellets, injection-molded products were prepared and then annealed in the same manner as in Example 1.

Proportions of the inorganic fillers and physical properties of the thus-molded products are shown in Table 4. It has been found that flexural modulus, electric characteristics (arc resistance) and the like can be improved markedly by the incorporation of an inorganic filler.

TABLE 4

| | ASTM | Example 2 | | Comp. Ex. |
|---|---|---|---|---|
| PTK (wt. %) | | 47 | 50 | 100 |
| Inorganic filler (wt. %) | | Talc 50 | CaSO₄ 20 | |
| | | Silica powder 3 | CaCO₃ 10 | |
| | | | TiO₂ 10 | |
| Fibrous filler (wt. %) | | — GF[1] | 10 | — |
| Flexural modulus (23° C.) (kg/mm²) | D790 | 1600 | 1700 | 490 |
| Arc resistance (sec) | D495 | 220 | 180 | 10 |
| Remarks | Polymer No. | K1 | K1 | K1 |

[1]Glass fibers: the same glass fibers as in Table 3.

EXAMPLE 3

In the same manner as in the preliminary experiment on the extrusion of the compositions, prescribed amounts of Polymer K2 as a PTK, a prescribed amount of glass fibers (13 μm across, 3 mm long; product of Nippon Electric Glass Co., Ltd.) and predetermined amounts of poly(paraphenylene thioether) (hereinafter abbreviated as "PTE") were respectively blended and formed into pellets. Injection-molded products were prepared from those pellets and then annealed in the same manner as in Example 1.

Their proportions and physical properties of the thus-molded products are shown in Table 5.

It has been found that the room-temperature mechanical strength of a PTK can be improved by the blend of PTE and the heat resistance of PTE can be improved by the blending of a PTK.

TABLE 3

| | ASTM | Example 1 | | Comparative Example | |
|---|---|---|---|---|---|
| PTK (wt. %) | | 59 | 70 | 100 | 100 |
| Fibrous filler (wt. %) | GF[1] | 41 CF[2] | 25 | — | — |
| | | Aramid[3] | 5 | | |
| Flexural strength (23° C.) (kg/mm²) | D790 | 29 | 22 | 7.5 | 6 |
| Flexural modulus (23° C.) (kg/mm²) | D790 | 1800 | 2000 | 490 | 500 |
| Heat distortion temperature (18.6 kg/cm²) (°C.) | D648 | 350 | 345 | 170 | 165 |
| Remarks | Polymer No. | K1 | K2 | K1 | K2 |

[1]Glass fibers, 13 μm across, 3 mm long (product of Nippon Electric Glass Co., Ltd.).
[2]Carbon fibers, 14.5 μm across, 3 mm long (product of Kureha Chemical Industry Co., Ltd.
[3]Aramid fibers, 3 mm long (KEVLAR, trade mark; product of Du Pont de Nemours & Co., Ltd.)

TABLE 5

|  | ASTM | Example 3 |  | Comparative Example |  |
|---|---|---|---|---|---|
| PTK (wt. %) |  | 60 | 36 | — |  |
| Thermoplastic resin (wt. %) |  | —PTE[1] | 24 PTE[1] | 60 |  |
| Fibrous filler (wt. %) | GF[2] | 40 GF[2] | 40 GF[2] | 40 |  |
| Flexural strength (23° C.) (kg/mm²) | D790 | 20 | 24 | 26 |  |
| Flexural modulus (23° C.) (kg/mm²) | D790 | 1800 | 1700 | 1500 |  |
| Heat distortion temperature (18.6 kg/cm²) (°C.) | D648 | 350 | 301 | 275 |  |
| Remarks | Polymer No. | K2 | K2 |  |  |

[1]Poly(paraphenylene thioether) ("FORTRON #W230", trade name; product of Kureha Chemical Industry Co., Ltd.).
[2]Glass fibers: the same glass fibers as in Table 3.

EXAMPLE 4

In the same manner as in the preliminary experiment on the extrusion of the compositions, prescribed amounts of Polymer K2 as a PTK were blended respectively with their corresponding predetermined amounts of a liquid crystalline polyester (LCP), followed by preparation of pellets. Polymer K2, a PTK, and LCP were singly formed into pellets in the same manner. Injection-molded products were prepared from those pellets and then annealed in the same manner as in Example 1.

Proportions of LCP and physical properties of the thus-molded products are shown in Table 6. It has been found that the room-temperature mechanical strength of a PTK can be improved by the blending of LCP and the blending of a PTK can reduce the anisotropy (a phenomenon in which physical properties such as flexural strength and flexural modulus vary considerably in the direction of injection and in a direction perpendicular to the former direction), which is a drawback of LCP.

EXAMPLE 5

Polymer K1 as a PTK and PTE ("FORTRON #W214", product of Kureha Chemical Industry Co., Ltd.) were blended at weight ratios of 20:80, 40:60, 60:40 and 80:20 respectively in the same manner as in the preliminary experiment on the extrusion of the compositions, whereby pellets of the individual compositions were prepared. Each pellet sample was placed between two sheets of polyimide film ("Kapton", trade mark; product of E.I. du Pont de Nemours & Co., Inc.). It was preheated at 385° C. for 2 minutes and then press-formed at 385° C. for 0.5 minute by hot press. It was then quenched to obtain an amorphous sheet whose thickness was about 0.15 mm. Sheets obtained in the above manner were all transparent.

In addition, transition temperatures (glass transition temperature, crystallization temperatures from both glassy state and molten state, melting point of crystals) of each sheet were measured by DSC. Results are shown in Table 7.

It has been found that PTKs and PTEs are highly compatible with each other from these transition temperatures.

TABLE 6

|  | ASTM | Example 4 |  | Comparative Example |  |
|---|---|---|---|---|---|
| PTK (wt. %) |  | 49.9 | 99.8 | — |  |
| Thermoplastic resin (wt. %) | LCP[1] | 49.9 | — | LCP[1] | 99.8 |
| Aid (mold release agent) (wt. %) |  | 0.2 | 0.2 |  | 0.2 |
| Flexural strength[2] (23° C.) (kg/mm²) | D790 | 10 | 6 |  | 16 |
| Flexural modulus[3] (23° C.) (kg/mm²) | D790 | 700 | 500 |  | 900 |
| Heat distortion temperature (18.6 kg/cm²) (°C.) | D648 | 172 | 165 |  | 180 |
| Anisotropy | — | Low | None |  | High |
| Remarks | Polymer No. | K2 | K2 |  |  |

[1]Liquid crystalline polyester ("VECTRA #A950", trade name; wholly-aromatic LCP; product of CELANESE Corporation).
[2]Measured in the direction of injection.
[3]Measured in the direction of injection.

TABLE 7

|  | Example 5 |  |  |  | Comp. Ex. |  |
|---|---|---|---|---|---|---|
| PTK (wt. %) | 80 | 60 | 40 | 20 | 100 | — |
| PTE[1] (wt. %) | 20 | 40 | 60 | 80 | — | 100 |
| Transition Temperature |  |  |  |  |  |  |
| Glass transition temperature[2] (°C.) | 123 | 112 | 95 | 91 | 134 | 85 |
| Crystallization temperature (°C.) |  |  |  |  |  |  |
| TC$_1$[3] | 159 | 151 | 155[6] | 164[7] | 168 | 128 |
| TC$_2$[4] | 286 | 257 | 240 | 223 | 312 | 228 |
| Melting point of crystals[5] (°C.) | 328 | 304 | 288 | 277 | 349 | 277 |

TABLE 7-continued

|  |  | Example 5 |  |  | Comp. Ex. |  |
|---|---|---|---|---|---|---|
| Remarks | Polymer No. | K1 | K1 | K1 | K1 | K1 |

[1] Poly(paraphenylene thioether) ("FORTRON #W214", trade name; product of Kureha Chemical Industry Co., Ltd.)
[2, 3] Measured from a glassy state. Measured at a heating rate of 10° C./min.
[4] Measured from molten state. After heating to 400° C. at a rate of 10° C./min, cooling was conducted at a rate of 10° C./min to perform the measurement.
[5] After heating to 400° C. at a rate of 10° C./min, cooling was conducted to 30° C. at a rate of 10° C./min. Thereafter, heating was carried out at a rate of 10° C./min to perform the measurement.
[6] A small peak was detected at 138° C.
[7] A small peak was detected at 134° C.

EXAMPLE 6

Polymer K1 as a PTK, polytetrafluoroethylene (PTFE) as a thermoplastic resin, graphite, $MoS_2$, $WS_2$ and carbon fibers (CF, same as the carbon fibers in Table 3) were respectively comminuted in a mill. A predetermined amount of fine powder of Polymer K1 and prescribed amounts of fine powders of the fillers were blended in a tumbler blender. The resultant compositions were respectively filled in a mold, compression-molded at 370° C. and 300 Kg/cm$^2$ for 10 minutes and then annealed at 280° C. for 4 hours, whereby compression-molded products of the respective compositions were obtained.

Self-lubricating properties of the molded products are shown in Table 8. It has been found that self-lubricating properties can be improved markedly by the addition of PTFE, graphite, $MoS_2$, $WS_2$ and/or CF.

the sake of comparison, PTK and the polyether imide were singly molten and kneaded in a similar manner to obtain their pellets.

Each pellet sample was placed between two sheets of polyimide film ("Kapton", trade mark; product of E.I. du Pont de Nemours & Co., Inc.). It was preheated at 390° C. for 2 minutes and then press-formed at 390° C. for 15 seconds by hot press. It was then quenched to obtain an amorphous sheet whose thickness was about 0.15 mm.

Transition temperatures of each sheet were measured by DSC. Results of the measurement are shown in Table 9.

It has been found that the glass transition temperature of a PTK as an index for its heat resistance and dimensional stability increases as the amount of a polyether imide to be blended with the PTK increases and also appears as a single peak. Further, the crystallinity of the

TABLE 8

|  | Example 6 |  |  |  |  |  | Comp. Ex. |
|---|---|---|---|---|---|---|---|
| PTK (wt. %) |  | 30 |  | 30 |  | 30 | 100 |
| Thermoplastic resin (wt. %) | PTFE[2] | 70 | PTFE[2] | 60 | PTFE[2] | 50 | — |
| Fibrous filler (wt. %) | — |  | — |  | CF[3] | 20 | — |
| Inorganic filler (wt. %) | — |  | Graphite | 7 | — |  | — |
|  |  |  | $MoS_2$ | 2 |  |  |  |
|  |  |  | $WS_2$ | 1 |  |  |  |
| Self-lubricating property[1] |  |  |  |  |  |  |  |
| Friction coefficient | 0.20 |  | 0.18 |  | 0.25 |  | >0.40 |
| Abrasion factor K (mm/Km)/(kg/cm$^2$) | $2 \times 10^{-5}$ |  | $1 \times 10^{-5}$ |  | $4 \times 10^{-5}$ |  | Measurement infeasible |
| Remarks Polymer No. | K1 |  | K1 |  | K1 |  | K1 |

[1] Testing machine: Suzuki-Type (thrust-type frictional wear testing machine) Counterpart material: SUS 304, pressure: 6 kg/cm$^2$, speed: 40 m/min, room temperature-dry, measurement time: 7 hours.
[2] Polytetrafluoroethylene.
[3] Carbon fibers (same as in Table 3).

EXAMPLE 7

Polymer K1 as a PTK and a polyether imide (hereinafter abbreviated as "PEI"; "ULTEM 1000", trade name; product of General Electric Company) as an amorphous thermoplastic resin were blended at weight ratios of 20:80, 40:60, 60:40 and 80:20 respectively. The resultant compositions were respectively charged into a single-screw extruder equipped with a nozzle of 2 mm across and having a cylinder diameter of 20 mm and a cylinder length of 50 cm and were molten and kneaded at a cylinder temperature of 370° C. to obtain strands. The strands were ground and were molten and kneaded again in a similar manner, whereby pellets of the individual compositions were obtained respectively. For PTK is maintained over the entire composition range.

Upon pelletization, the melt flowability became better than that of the polyether imide alone and the drawndown was also improved over that of the PTK alone.

In Table 9, the melt processability of each resin or resin composition was determined by observing the melt flowability of each resin or resin composition upon preparation of its pellets. Results of the observation were ranked by the following 4-stage evaluation standard:

⊚ : Excellent.
○ : Good
△: Somewhat insufficient.
✕: Poor.

TABLE 9

|  | Example 7 |  |  |  | Comp. Ex. |  |
|---|---|---|---|---|---|---|
| PTK (wt. %) | 80 | 60 | 40 | 20 | 100 | — |
| PEI[1] (wt. %) | 20 | 40 | 60 | 80 | — | 100 |
| Transition Temperature |  |  |  |  |  |  |
| Glass transition temperature[2] (°C.) | 154 | 192 | 194 | 198 | 137[3] | 213 |

TABLE 9-continued

|  | Example 7 |  |  |  | Comp. Ex. |  |
| --- | --- | --- | --- | --- | --- | --- |
| Crystallization temperature (°C.) |  |  |  |  |  |  |
| $TC_1{}^3$ | 184 | 192 | 196 | 200 | 174 | N.D.[7] |
| $TC_2{}^4$ | 314 | 309 | 300 | 280 | 316 | N.D.[7] |
| Melting point of crystals[5] (°C.) | 349 | 346 | 341 | 334 | 351 | N.D.[7] |
| Melt Processability Flowability[6] | ◎ | O | O | Δ | ◎ | X |
| Remarks     Polymer No. | K1 | K1 | K1 | K1 | K1 |  |

[1]Polyether imide ("ULTEM 1000", trade name; product of General Electric Company).
[2]After heating to 400° C. at a rate of 10° C./min, cooling was conducted to 30° C. at a rate of 10° C./min. Thereafter, heating was carried out at a rate of 10° C./min to perform the measurement.
[3]Measured from a glassy state. Measured at a heating rate of 10° C./min.
[4]Measured from molten state. After heating to 400° C. at a rate of 10° C./min, cooling was conducted at a rate of 10° C./min to perform the measurement.
[5]Measured under the same conditions as in the above footnote[2].
[6]Flowability was observed upon preparation of pellets. ◎> OΔ > X, such being arranged in the order of from excellent flowability to poor flowability.
[7]No peak was detected.

EXAMPLE 8

Polymer K1 as a PTK and a PEEK ("Victrex PEEK 380P", trade name; product of Imperial Chemical Industries Ltd.) were blended at weight ratios of 20:80, 40:60, 60:40 and 80:20 respectively. The resultant compositions were respectively molten and kneaded and formed into amorphous sheets by a similar procedure of Example 7, and their transition temperatures were measured. Measurement results are summarized in Table 10.

PTK and PEEK have been found to have good compatibility from the glass transition temperatures, the crystallization temperatures from a glassy state and the melting points of crystals.

The glass transition temperature which serves as an index for the retention of mechanical properties at high temperatures and the dimensional stability at high temperatures becomes higher by blending a PEEK to a PTK, with the increase of proportion of the PEEK blended. From the side of the PEEK, its blend with the PTK can improve the melting point which serves as an index for its heat resistance and dimensional stability.

It has also been appreciated that the balance between melt flowability and the toughness of strands can be improved by blending PEEK and PTK together.

In Table 10, the melt processability of each resin or resin composition is ranked in accordance with the same 4-stage evaluation standard as that employed in Table 7:
 ◎ : Excellent.
 O : Good.
 Δ: Somewhat insufficient.
 X: Poor.

Further, the toughness of strands of each resin or rein composition was determined by observing the strands upon preparation of the pellets. Observation results are ranked in accordance with the following 3-stage evaluation standard:
 ◎ : Excellent.
 O : Good.
 Δ: Somewhat insufficient.

TABLE 10

|  | Example 8 |  |  |  | Comp. Ex. |  |
| --- | --- | --- | --- | --- | --- | --- |
| PTK (wt. %) | 80 | 60 | 40 | 20 | 100 | — |
| PEEK[1] (wt. %) | 20 | 40 | 60 | 80 | — | 100 |
| Transition Temperature |  |  |  |  |  |  |
| Glass transition temperature[2] (°C.) | 136 | 137 | 139 | 140 | 134 | 142 |
| Crystallization temperature (°C.) |  |  |  |  |  |  |
| $TC_1{}^3$ | 172 | 172 | 172 | 174 | 169 | 176 |
| Melting point of crystals[4] (°C.) | 347 | 340 | 339 | 338 | 349 | 338 |
| Melt Processability Flowability[5] | ◎ | O | O | Δ | ◎ | X |
| Properties of Extrudate |  |  |  |  |  |  |
| Toughness of strands[6] | Δ | O | O | ◎ | Δ | ◎ |
| Remarks     Polymer No. | K1 | K1 | K1 | K1 | K1 |  |

[1]Polyether ether ketone ("Victrex PEEK 380P", trade name; product of Imperial Chemical Industries Ltd.)
[2-4]Measured by heating each resin sample at a rate of 10° C./min from a glassy state.
[5]Flowability was observed upon preparation of pellets. ◎> O> Δ > X, such being arranged in the order of from excellent flowability to poor flowability.
[6]Strands were observed upon preparation of pellets. ◎> O> Δ, such being arranged in the order of toughness.

EXAMPLE 9

Polymer K1 as a PTK and a polyether sulfone (hereinafter abbreviated as "PES"; "PES 4100G", trade name; product of Sumitomo Chemical Co., Ltd.) were blended at weight ratios of 20:80, 40:60, 60:40 and 80:20 respectively. The resultant compositions were respectively molten and kneaded and formed into amorphous sheets by a similar procedure of Example 7, and their transition temperatures were measured. Measurement results are summarized in Table 11.

The flowability upon melting and kneading and the toughness of strands are balanced well due to the blend of PES with PTK.

The crystallinity of PTK is maintained even when the blend ratio of PES is varied as described above. It is possible to control the melting point and crystallization temperatures (both $TC_1$ and $TC_2$) by changing the proportion of PES.

In Table 11, the melt processability and strand toughness of each resin or resin composition are ranked in accordance with the same evaluation standards as in Example 8. As the glass transition point of each resin composition, two peaks were observed, one corresponding to the PTK and the other to PES.

TABLE 11

|  | Example 9 |  |  |  | Comp. Ex. |  |
|---|---|---|---|---|---|---|
| PTK (wt. %) | 80 | 60 | 40 | 20 | 100 | — |
| PES[1] (wt. %) | 20 | 40 | 60 | 80 | — | 100 |
| Transition Temperature |  |  |  |  |  |  |
| Glass transition temperature[2] (°C.) | 135 | 133 | 134 | 135 | 134 | — |
|  | 206 | 208 | 208 | 212 | — | 217 |
| Crystallization temperature (°C.) |  |  |  |  |  |  |
| $TC_1$[3] | 171 | 171 | 173 | 175 | 169 | — |
| $TC_2$[4] | 313 | 310 | 304 | 292 | 316 | — |
| Melting point of crystals[5] (°C.) | 351 | 348 | 347 | 340 | 351 | — |
| Melt Processability |  |  |  |  |  |  |
| Flowability | ◎ | ○ | ○ | △ | ◎ | X |
| Properties of Extrudate |  |  |  |  |  |  |
| Toughness of strands[7] | △ | ○ | ○ | ◎ | △ | ◎ |
| Remarks    Polymer No. | K1 | K1 | K1 | K1 | K1 |  |

[1]Polyether sulfone ("PES 4100G", trade name; product of Sumitomo Chemical Co., Ltd.)
[2-5]Measured under the same conditions as in Table 7.
[6]Flowability was observed upon preparation of pellets. ◎> ○> △ > X, such being arranged in the order of from excellent flowability to poor flowability.
[7]Strands were observed upon preparation of pellets. ◎> ○> △, such being arranged in the order of toughness.

We claim:

1. A melt-stable poly(arylene thioether-ketone) composition comprising:
(A) 100 parts by weight of a melt-stable poly(arylene thioether-ketone) having predominant recurring units of the formula

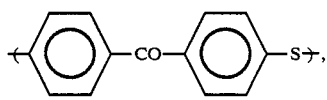

wherein the —CO— and —S— are in the para position to each other, and having the following physical properties (a)-(c):
(a) melting point, Tm being 310–380° C.;
(b) residual melt crystallization enthalpy, ΔHmc (420° C./10 min) being at least 10 J/g, and melt crystallization temperature, Tmc (420° C./10 min) being at least 210° C., wherein ΔHmc (420° C./10 min) and Tmc (420° C./10 min) are determined by a differential scanning calorimeter at a cooling rate of 10° C./min after the poly(arylene thioether-ketone) is held at pv 50° C. for 5 minutes in an inert gas atmosphere, heated to 420° C. at a rate of 75° C./min and then held for 10 minutes at 420° C;
(c) reduced viscosity being 0.2–2 dl/g as determined by viscosity measurement at 25° C. and a polymer concentration of 0.5 g/dl in 98 percent by weight sulfuric acid;
(B) 0–400 parts by weight of at least one thermoplastic resin; and
(C) at least one filler selected from fibrous fillers and inorganic fillers in a proportion of 0–400 parts by weight per 100 parts by weight of the sum of said components (A) and (B);
at least one of said components (B) and (C) being contained in a proportion of at least 0.1 part by weight per 100 parts by weight of said component (A).

2. The composition as claimed in claim 1, wherein the poly(arylene thioether-ketone) has a density of at least 1.34 g/cm³ at 25° C. when annealed at 280° C. for 30 minutes.

3. The composition as claimed in claim 1, wherein the poly(arylene thioether-ketone) is an uncured polymer.

4. The composition as claimed in claim 1, wherein the thermoplastic resin is a poly(arylene thioether) having predominant recurring units of the formula

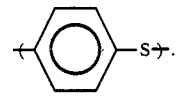

5. The composition as claimed in claim 1, wherein the thermoplastic resin is a liquid-crystalline polyester.

6. The composition as claimed in claim 1, wherein the thermoplastic resin is a polyether imide.

7. The composition as claimed in claim 1, wherein the thermoplastic resin is polytetrafluoroethylene.

8. The composition as claimed in claim 1, wherein the thermoplastic resin is an aromatic polyether ketone.

9. The composition as claimed in claim 1, wherein the thermoplastic resin is an aromatic polysulfone.

10. The composition as claimed in claim 1, wherein the fibrous filler is at least one fibrous filler selected from the group consisting of glass fibers, carbon fibers and Aramid fibers.

* * * * *

Disclaimer 4,895,892.—*Yoshikatsu Satake; Takashi Kaneko; Yutaka Kobayashi; Yo Iizuka; Toshitak Kouyama; Takayuki Katto; Zenya Shiiki*, all of Iwaki, Japan. MELT-STABLE POLY(ARYLENE THIOETHER-KETONE) COMPOSITIONS. Patent dated Jan. 23, 1990. Disclaimer filed Feb. 14, 1990, by the assignee, Kureha Kagaku Kogyo K. K.

The term of this patent subsequent to October 10, 2006, has been disclaimed.
[ *Official Gazette April 24, 1990* ]